(12) United States Patent
Kang

(10) Patent No.: US 11,452,397 B2
(45) Date of Patent: Sep. 27, 2022

(54) PLASTIC RATTAN MAT GLUE INJECTION AND PENETRATION STRUCTURE AND PROCESSING METHOD THEREOF

(71) Applicant: LINHAI YONGXIN ANYING OUTDOOR PRODUCTS CO., LTD, Zhejiang (CN)

(72) Inventor: Zhiyong Kang, Zhejiang (CN)

(73) Assignee: LINHAI YONGXIN ANYING OUTDOOR PRODUCTS CO., LTD, Zhejiang (CN)

(*) Notice: Subject to any disclaimer, the term of this patent is extended or adjusted under 35 U.S.C. 154(b) by 0 days.

(21) Appl. No.: 17/266,629

(22) PCT Filed: Nov. 12, 2018

(86) PCT No.: PCT/CN2018/114981
§ 371 (c)(1),
(2) Date: Feb. 8, 2021

(87) PCT Pub. No.: WO2020/047996
PCT Pub. Date: Mar. 12, 2020

(65) Prior Publication Data
US 2021/0298504 A1    Sep. 30, 2021

(30) Foreign Application Priority Data
Sep. 6, 2018    (CN) .......................... 201811039797.0

(51) Int. Cl.
*A47G 27/02* (2006.01)
*B27G 11/00* (2006.01)
*B27J 1/00* (2006.01)

(52) U.S. Cl.
CPC .......... *A47G 27/0268* (2013.01); *B27G 11/00* (2013.01); *B27J 1/00* (2013.01); *B32B 2305/188* (2013.01)

(58) Field of Classification Search
CPC ................. A47G 27/0268; B27G 11/00; A47B 2220/0088; B32B 2305/188
See application file for complete search history.

(56) References Cited

FOREIGN PATENT DOCUMENTS

| CN | 201012000 | 1/2008 |
|---|---|---|
| CN | 201150388 | 11/2008 |
| CN | 201641189 | 11/2010 |
| CN | 103202616 | 7/2013 |

(Continued)

OTHER PUBLICATIONS

"International Search Report (Form PCT/ISA/210)" of PCT/CN2018/114981, dated May 30, 2019, with English translation thereof, pp. 1-6.

(Continued)

*Primary Examiner* — Carson Gross
(74) *Attorney, Agent, or Firm* — JCIP Global Inc.

(57) ABSTRACT

A plastic rattan mat glue injection and penetration structure and a processing method thereof are provided. Two plastic layers are respectively provided on end portions at two sides of a rattan mat, and protruding structures are respectively formed on the end portions of the rattan mat. Furthermore, glue injection intervals of the rattan mat are defined by glue injection molds, and each of the glue injection intervals is disposed between the glue injection molds and a side of the rattan mat.

11 Claims, 7 Drawing Sheets

B—B

(56) References Cited

FOREIGN PATENT DOCUMENTS

| CN | 104523081 | | 4/2015 | |
|---|---|---|---|---|
| CN | 104586126 | | 5/2015 | |
| CN | 104586126 A | * | 5/2015 | ............... A47C 5/02 |
| CN | 107825548 | | 3/2018 | |
| CN | 207077838 | | 3/2018 | |
| JP | 2002349730 | | 12/2002 | |

OTHER PUBLICATIONS

"Written Opinion of the International Searching Authority (Form PCT/ISA/237)" of PCT/CN2018/114981, dated May 30, 2019, pp. 1-3.

* cited by examiner

A−A

B−B

PLASTIC RATTAN MAT GLUE INJECTION AND PENETRATION STRUCTURE AND PROCESSING METHOD THEREOF

CROSS-REFERENCE TO RELATED APPLICATION

This application is a 371 of international application of PCT application serial no. PCT/CN2018/114981, filed on Nov. 12, 2018, which claims the priority benefit of China application no. 201811039797.0, filed on Sep. 6, 2018. The entirety of each of the above mentioned patent applications is hereby incorporated by reference herein and made a part of this specification.

BACKGROUND

Technical Field

The invention relates to the field of the rattan mats and processing method thereof, in particular to a plastic rattan mat glue injection and penetration structure and a processing method thereof.

Description of Related Art

The rattan mat is one of the oldest furniture varieties in the world, which carries profound cultural heritage. The rattan mat is generally woven by several rattan strips. In order to keep the surface of the rattan mat in tension and prevent the rattan strips from loosening, the edge banding treatment is usually carried out at the ends of the rattan mat. The existing edge banding treatment is generally to heat the ends of the rattan mat through a heating mold, so that the rattan at the ends of the rattan mat is in a semi-molten state. Then, through extrusion and solidification molding, the ends of the rattan mat are integrated to form a mutual restraint structure, and a protruding structure is formed at the ends of the rattan mat, facilitating the rattan mat and the outer frame to be fixed through penetration. This treatment method is simple, fast, and low in cost, and is widely used in the plastic rattan mat manufacturing industry. However, in the process of edge banding treatment, more plastic slag will stick to the heating mold, resulting in a lot of waste of resources. In addition, the end of the rattan mat will be ununiformly heated or the material of the rattan mat itself is different, resulting in ununiform edge banding and fastening. When carrying out penetration for fixing, because of the instability of the ends of the rattan mat, the rattan mat is prone to have unstable clamping during penetration. Especially in the process of penetration at the corner, the rattan mat is prone to have faults due to unstable ends and weak toughness, so that the quality of the rattan mat cannot be well guaranteed.

SUMMARY

In order to overcome the defects of the prior art, the present invention provides a plastic rattan mat glue injection and penetration structure with uniform and reliable edge banding and excellent quality and a processing method thereof.

The technical solution adopted by the present invention to solve the technical problems is as follows:

A processing method of plastic rattan mat glue injection and penetration structure, characterized by comprising:

Step 1: weaving, including weaving a plurality of rattan strips into a rattan mat;

Step 2: cutting, including cutting the rattan mat obtained in step 1 into a required specification and shape;

Step 3: clamping, including fully unfolding and fixedly clamping the rattan mat cut in step 2 on a glue injection platform;

Step 4: injecting glue, including arranging plastic layers at end portions of the rattan mat for injecting glue and fixing, and forming a protruding structure at each of the end portions of the rattan mat for penetration and snap-fitting; and Step 5: penetrating, including inserting the rattan mat obtained in step 4 into an outer frame, the end portion of the rattan mat passes through the outer frame and is clamped in the outer frame through the protruding structure to stretch and fix the rattan mat.

In the present invention, in step 4, the plastic layers are formed by pouring a round along the end portions of the rattan mat through a glue injection head, and each of the plastic layers is provided with two layers, one of the two layers is poured on the end portions of one side of the rattan mat first, and after cooling, the other of the two layers is poured on the end portions of the other side of the rattan mat.

In the present invention, in step 3, a glue injection mold is arranged on the glue injection platform, the rattan mat cut in step 2 is fixed by the glue injection mold, bosses for glue injection and edge banding are arranged on the glue injection mold, and the bosses are arranged on both sides of the rattan mat. A glue injection interval is formed between each of the bosses and one of the two sides of the rattan mat, and the glue injection intervals are matched with the plastic layers.

In the present invention, in step 4, the plastic layers are formed by injecting molten plastic into the glue injection intervals and cooling the injected plastic, and each of the plastic layers is provided with two layers respectively arranged at the end portions of both sides of the rattan mat.

In the present invention, in step 4, the end portions of the rattan mat are preheated to soften the end portions of the rattan mat, and then glue injection is carried out after the end portions are softened.

In the present invention, in step 4, the solid plastic is put into each of the glue injection intervals, and the solid plastic is heated so that the plastic is fused and tightly attached with the rattan mat, and then cooled to form the plastic layer, and each of the plastic layers is provided with two layers respectively arranged at the end portions of the both sides of the rattan mat.

In that invention, the plastic rattan mat glue injection and penetration structure are manufactured by the above-mentioned processing method of plastic rattan mat glue injection and penetration structure.

In the present invention, an opening groove for the rattan mat passing therethrough and an inner cavity for being engaged with the end portion of the rattan mat are arranged in the outer frame, the end portion of the rattan mat passes through the opening slot and is fixedly connected to the outer frame, and each of the plastic layers is installed in the inner cavity of the outer frame.

In the present invention, a thickness of the plastic layers ranges 1 mm~3 mm, and a total thickness of the rattan mat and the two plastic layers ranges 5 mm~6 mm.

In the present invention, a ratio of the thickness of the plastic layer to a thickness of the rattan mat is between 0.4 and 1.

Beneficial effects of the present invention are as follows. According to the plastic rattan mat glue injection and penetration structure and the processing method thereof of the present invention, two plastic layers are respectively provided on the end portions at two sides of a rattan mat, and protruding structures are respectively formed on the end portions of the rattan mat, so that the edge banding of the rattan mat is uniform and reliable, and snap-fitting during penetration of the rattan mat is facilitated. Furthermore, glue injection intervals of the rattan mat are defined by glue injection molds, so that the plastic layers can be quickly and easily formed, thereby increasing the rattan mat processing and forming quality. Moreover, by provision of the glue injection molds, the glue injection amount during the formation of the plastic layers can be effectively controlled, so as to save glue injection materials, thereby reducing the processing costs of the rattan mat.

BRIEF DESCRIPTION OF THE DRAWINGS

The present invention will be further explained with reference to the drawings and embodiments.

DESCRIPTION OF THE EMBODIMENTS

Figure 1:
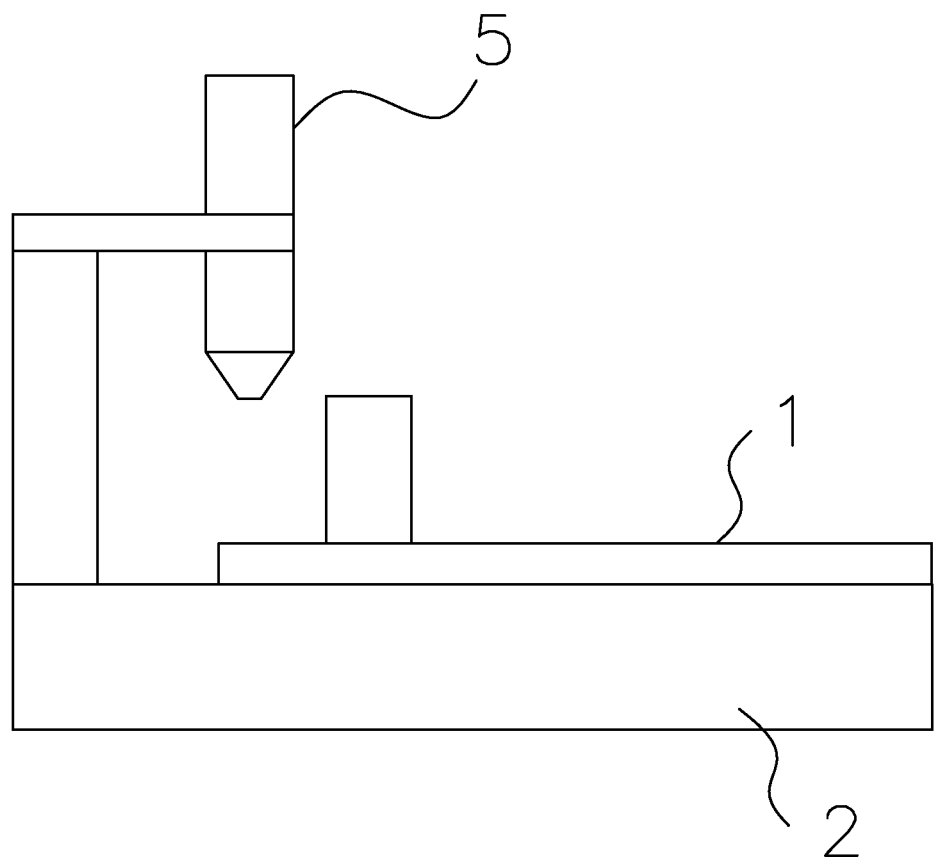
FIG. 1 is a schematic diagram of glue injection process of embodiment 1.
Figure 2:
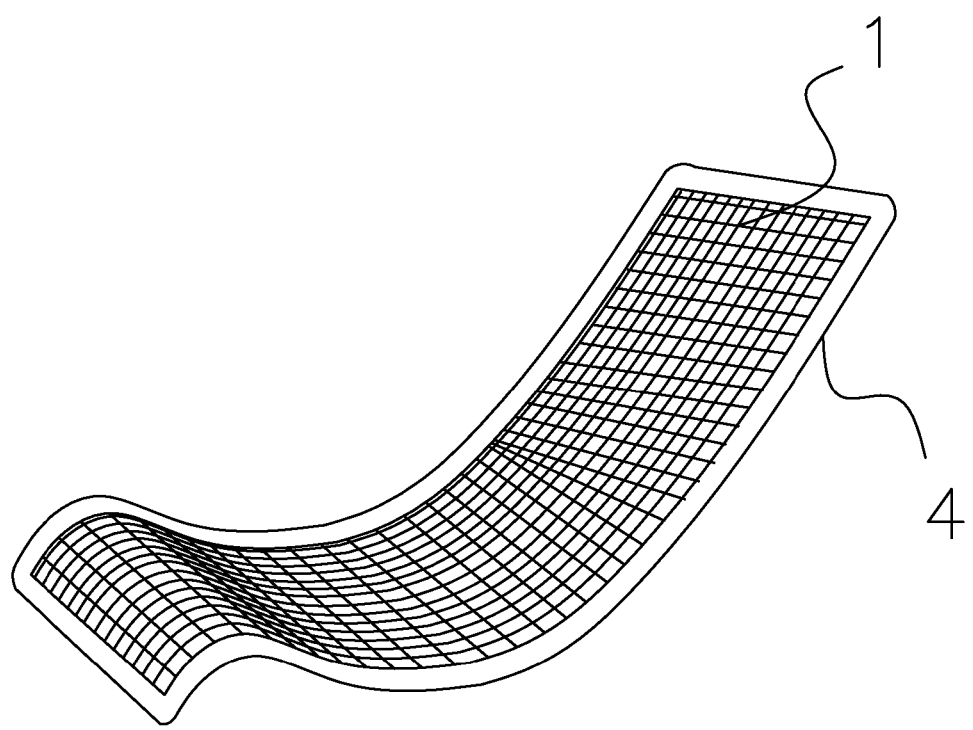
FIG. 2 is a schematic diagram of the overall structure of embodiment 1.
Figure 3:
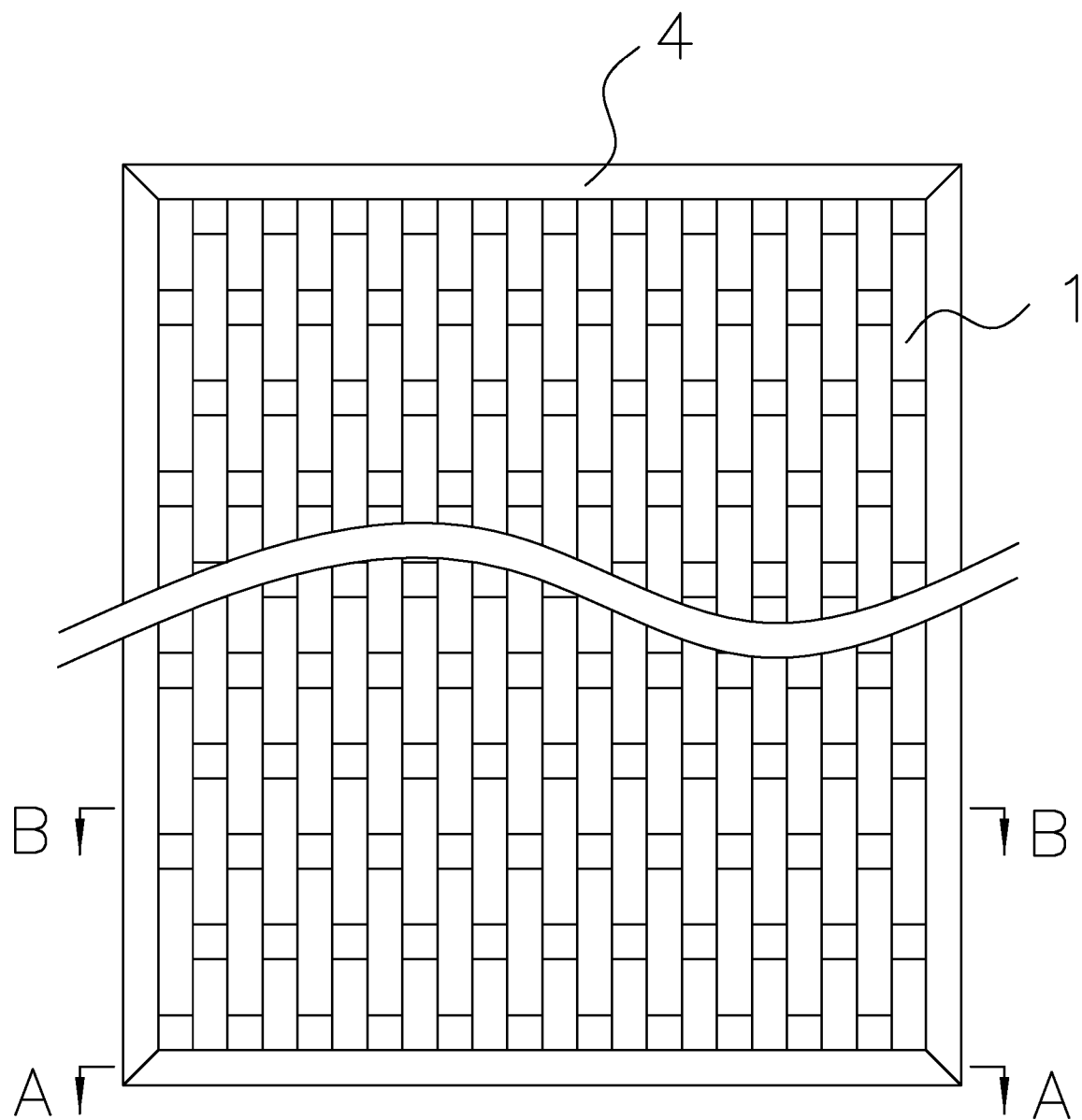
FIG. 3 is an expanded view of FIG. 2.
Figure 4:
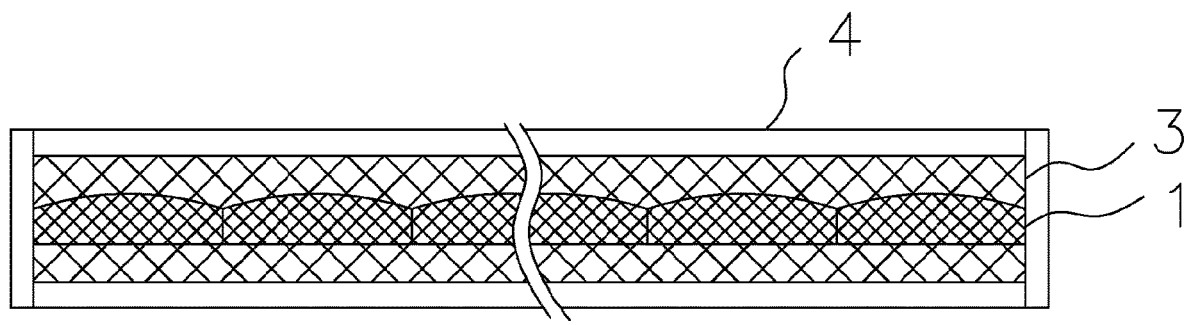
FIG. 4 is a sectional view taken along line A-A in FIG. 3.
Figure 5:
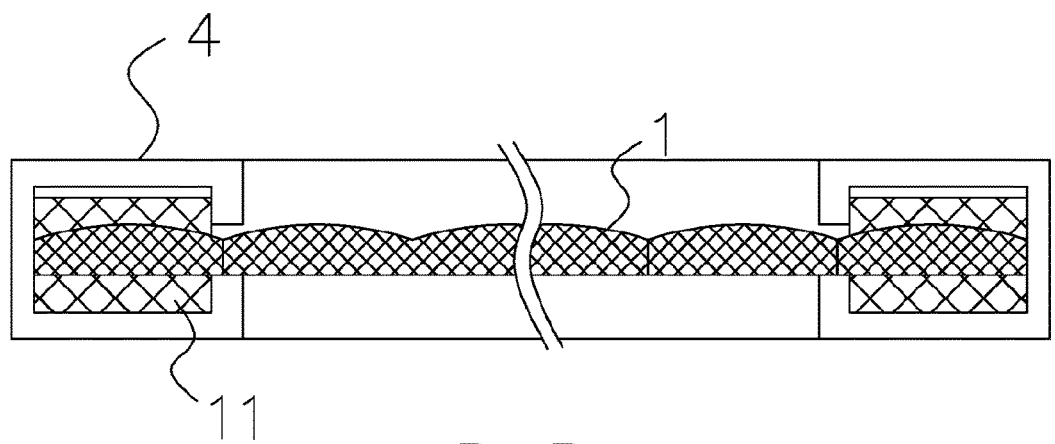
FIG. 5 is a sectional view taken along line B-B in FIG. 3.
Figure 6:
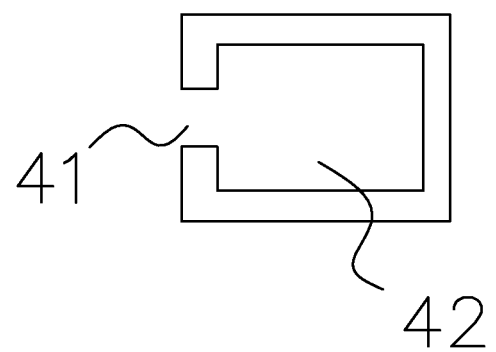
FIG. 6 is a schematic structural diagram of an outer frame of embodiment 1.

In order to make the objectives, technical solutions and advantages of the embodiments of the present invention clearer, the technical solutions in the embodiments of the present invention will be described clearly and completely with reference to the drawings in the embodiments.

Embodiment 1

As shown in FIG. 1 to FIG. 6, a processing method of plastic rattan mat glue injection and penetration structure is characterized by comprising the following steps.

Step 1: Weaving, including weaving a plurality of rattan strips into a rattan mat 1.

Step 2: Cutting, including cutting the rattan mat 1 obtained in step 1 into a required specification shape. The cut rattan mat 1 is rectangular.

Step 3: Clamping, including fully unfolding and fixedly clamping the rattan mat 1 cut in step 2 on the glue injection platform 2.

Step 4: Injecting glue, including preheating end portions of the rattan mat 1 by hot air source 8 to soften the end portions of the rattan mat 1, then injecting glue after a time interval of 5 seconds, so that the end portions of the rattan mat 1 and plastic layer 3 can be better fused together. Providing plastic layers 3 at the end portions of the rattan mat 1 for glue injection and fixing, and form a protruding structure 11 for penetration and snap-fitting at the end portions of the rattan mat 1. When injecting glue, one layer of the plastic layers 3 is poured on the end portions of one side of the rattan mat 1 first, and after cooling, the other one layer of the plastic layers 3 is poured on the end portions of the other side of the rattan mat 1, so as to form a two-layer plastic layer 3. The plastic layers 3 are formed by pouring one round along the end portions of the rattan mat 1 through glue injection head 5.

Step 5: Penetrating, including inserting the rattan mat 1 obtained in step 4 into an outer frame 4, each end portion of the rattan mat 1 passes through the outer frame 4 and is clamped in the outer frame 4 through the protruding structure 11 to stretch and fix the rattan mat 1.

The end portions of the rattan mat 1 are tightly connected through the above processing method. The edge banding of the end portions of the rattan mat 1 is reliable, and the protruding structure is formed at the end portions of the rattan mat 1, facilitating snap-fitting during penetration of the rattan mat 1, effectively improving the quality of the rattan mat 1 and prolonging the service life of the rattan mat 1. A thickness of the plastic layer 3 is 1.5 mm, a total thickness of the rattan mat 1 and the two plastic layers 3 is 5 mm, and a ratio of thickness of the plastic layer 3 to thickness of the rattan mat 1 is 0.75. A width of the plastic layer 3 is 8 mm, and a length of the plastic layer 3 matches a length of the end portion of the rattan mat 1. The reasonable ratio of thickness of the plastic layer 3 to thickness of the rattan mat 1 can make the edge banding of the rattan mat 1 more stable and save production materials. The plastic injection material of the plastic layer 3 is the same as the molding material of the rattan mat 1, so that the degree of fusion between them is higher and the connection between them is more compact. When the rattan mat 1 is inserted into the outer frame 4, it can be clamped in the outer frame 4 through the upper and lower plastic layers 3, and through the uniformly arranged structure of the two plastic layers 3, the penetration work of the rattan mat 1 is smoother, and the rattan mat 1 can be firmly connected with the outer frame 4 to improve the tensile strength of the rattan mat 1. Further, when carrying out penetration on the rattan mat 1 at the corner of the outer frame 4, the flexibility of the end portions of the rattan mat 1 is better through the structure of uniformly arranged plastic layer 3, facilitating the rattan mat 1 to pass through the corner of the outer frame 4 stably and smoothly.

As a preferred embodiment, the outer frame 4 is provided with an opening slot 41 for the rattan mat 1 to pass therethrough, and an inner cavity 42 for being engaged with the end portion of the rattan mat 1. The end portion of the rattan mat 1 is fixedly connected with the outer frame 4 through the opening slot 41, and the plastic layer 3 is installed in the inner cavity 42 of the outer frame 4, facilitating fixing of the end portion of the rattan mat 1.

Embodiment 2

Figure 7:
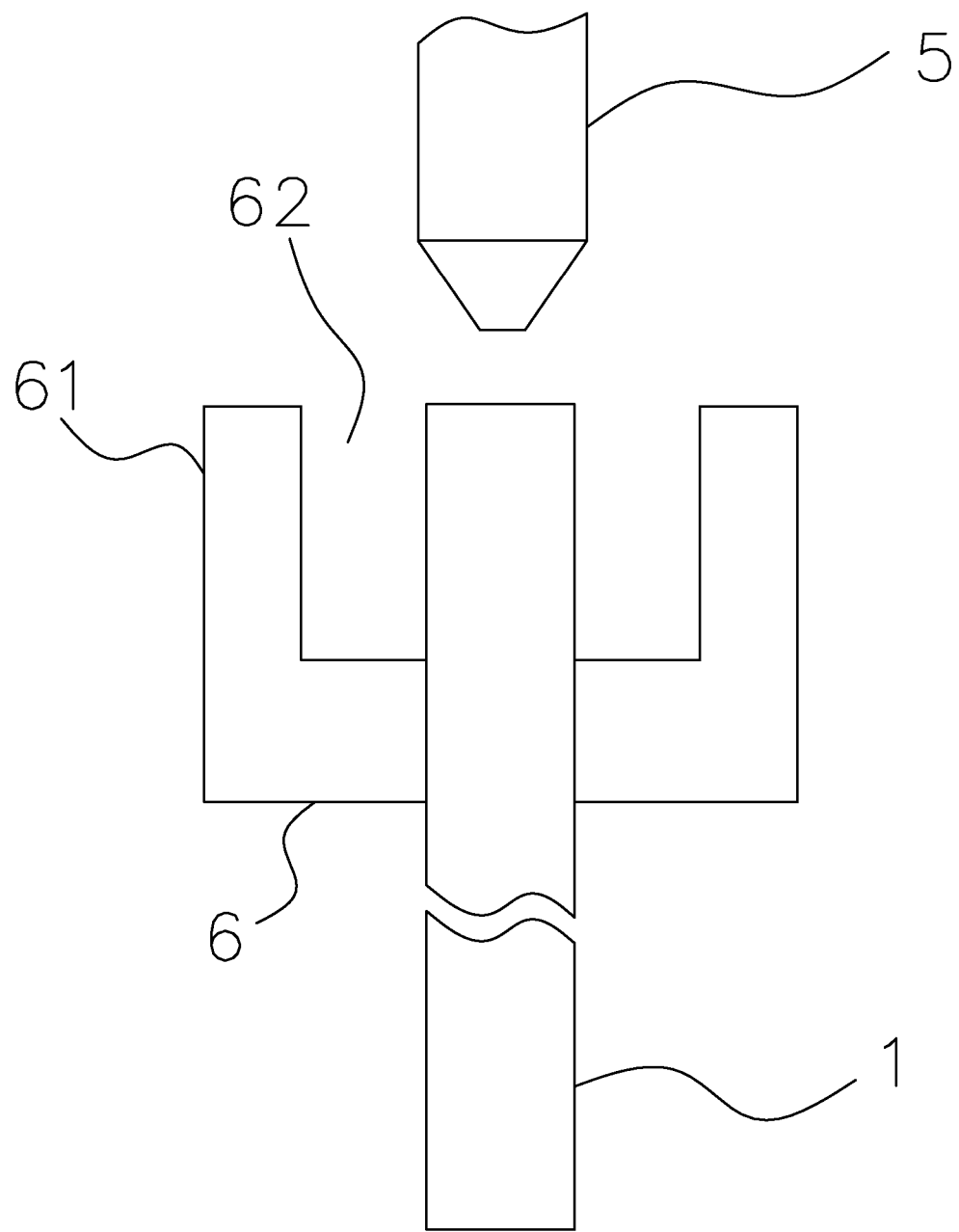
FIG. 7 is a schematic diagram of glue injection process of embodiment 2.

As shown in FIG. 7, the embodiment 2 is roughly the same as the embodiment 1, except that two glue injection molds 6 are arranged on the glue injection platform 2 in step 3, the two glue injection molds 6 are respectively arranged on both sides of the rattan mat 1. The rattan mat 1 cut in the step 2 is fixed by the glue injection molds 6, and the glue injection molds 6 are provided with bosses 61 for glue injection and edge banding. The bosses 61 are respectively arranged on both sides of the rattan mat 1, and a glue injection interval 62 is formed between each of the bosses 61 and one of the two sides of the rattan mat 1. The glue injection intervals 62 are matched with the plastic layers 3. In step 4, the plastic layer 3 is formed by injecting molten plastic into the glue injection intervals 62 and cooling the injected plastic, and each of the plastic layers 3 is provided with two layers respectively arranged at the end portions of both sides of the rattan mat 1. By provision of the glue injection molds 6, the molding of the plastic layer 3 is faster and more convenient, and the processing efficiency and molding quality of the rattan mat 1 are improved. In addition, by provision of the glue injection molds 6, the glue injection amount of the plastic layer 3 in the molding process can be effectively controlled, thereby reducing the processing cost of the rattan mat 1.

Embodiment 3

Figure 8:
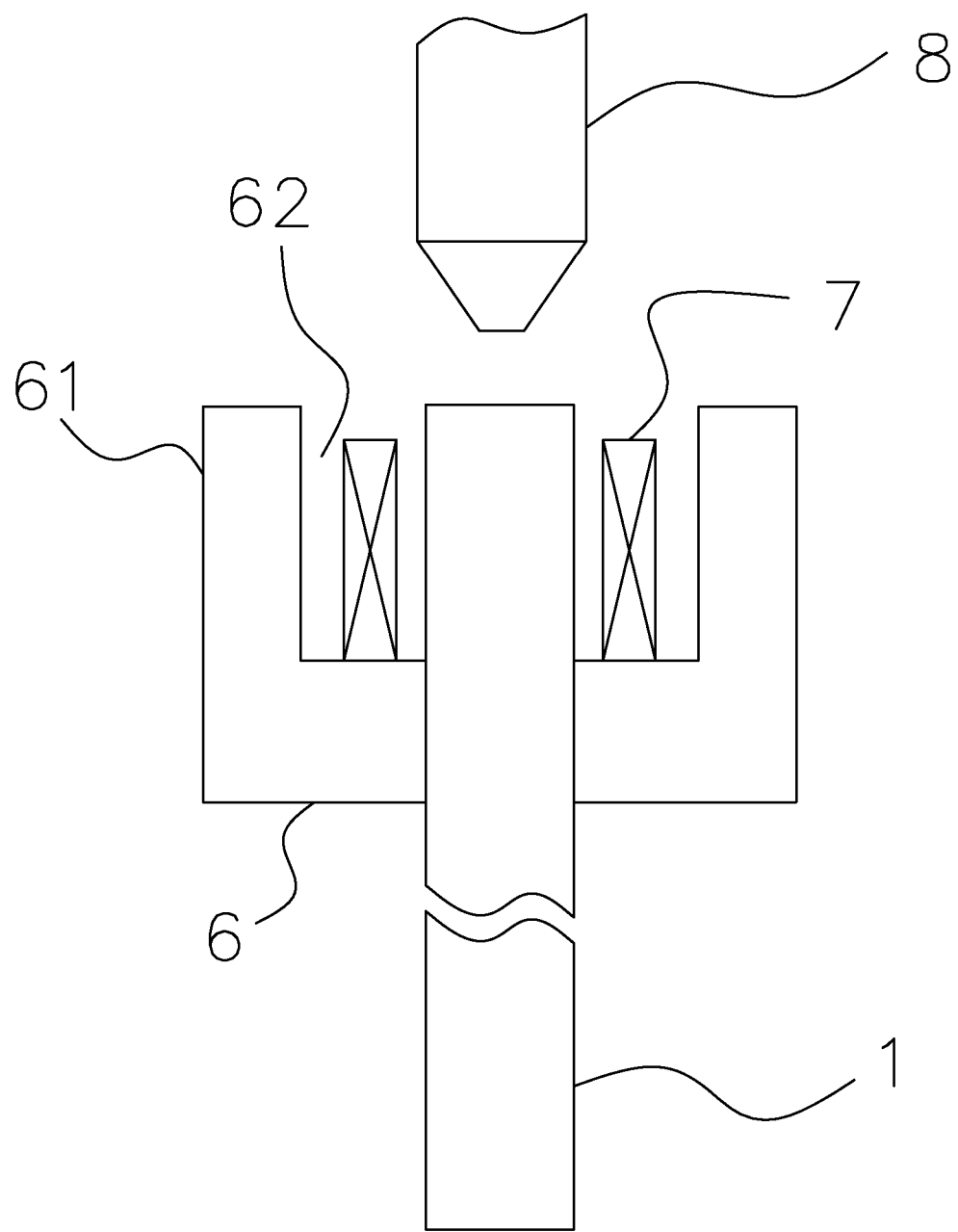
FIG. 8 is a schematic diagram of glue injection process of embodiment 3.

As shown in FIG. 8, the embodiment 3 is almost the same as embodiment 2, except that in step 4, the solid plastic 7 is put into each of the glue injection intervals 62, and a hot air source 8 is arranged above the glue injection sections 62, so that the solid plastic 7 is heated by hot air to fuse and tightly attach with the rattan mat 1, and is then cooled to form a plastic layer 3. The plastic layer 3 is provided with two layers, which are respectively arranged at the end portions of both sides of the rattan mat 1. Through the process of melting the solid plastic 7 to fuse with the rattan mat 1 to form an edge seal, the processing method of the rattan mat 1 is simpler and faster, and the processing difficulty of the rattan mat 1 is reduced, thereby reducing the production cost of the rattan mat 1.

The above is only the preferred embodiments of the present invention, and the technical solutions that achieve the objectives of the present invention by basically the same means fall within the protection scope of the present invention.

What is claimed is:

1. A processing method of plastic rattan mat glue injection and penetration structure, comprising:
   step 1: weaving, including weaving a plurality of rattan strips into a rattan mat;
   step 2: cutting, including cutting the rattan mat obtained in step 1 into a required specification and shape;
   step 3: clamping, including fully unfolding and fixedly clamping the rattan mat cut in step 2 on a glue injection platform;
   step 4: injecting glue, including arranging plastic layers at end portions of the rattan mat for injecting glue and fixing, and forming a protruding structure at each end portion of the rattan mat for penetration and snap-fitting; and
   step 5: penetrating, including inserting the rattan mat obtained in step 4 into an outer frame, wherein each end portion of the rattan mat passes through the outer frame and is clamped in the outer frame through the protruding structure to stretch and fix the rattan mat.

2. The processing method of plastic rattan mat glue injection and penetration structure according to claim 1, wherein in step 4, the plastic layers are formed by pouring along the end portions of the rattan mat through a glue injection head, and each of the plastic layers is provided with two layers, one layer of the plastic layers is poured on the end portions of one side of the rattan mat first, and after cooling, the other one layer of the plastic layers is poured on the end portions of another side of the rattan mat.

3. The processing method of plastic rattan mat glue injection and penetration structure according to claim 2, wherein in step 4, the end portions of the rattan mat are preheated to soften the end portions of the rattan mat, and glue injection is performed after the end portions are softened.

4. The processing method of plastic rattan mat glue injection and penetration structure according to claim 1, wherein in step 3, a glue injection mold is arranged on the glue injection platform, the rattan mat cut in step 2 is fixed by the glue injection mold, bosses for glue injection and edge banding are arranged on the glue injection mold, and the bosses are respectively arranged on both sides of the rattan mat; a glue injection interval is formed between each of the bosses and a respective one of the sides of the rattan mat, and the glue injection intervals are matched with the plastic layers.

5. The processing method of plastic rattan mat glue injection and penetration structure according to claim 4, wherein in step 4, the plastic layers are formed by injecting molten plastic into the glue injection intervals and cooling the injected plastic, and each of the plastic layers is provided with two layers respectively arranged at the end portions of the both sides of the rattan mat.

6. The processing method of plastic rattan mat glue injection and penetration structure according to claim 4, wherein in step 4, a solid plastic is put into each of the glue injection intervals, and the solid plastic is heated so that the solid plastic is fused and tightly attached with the rattan mat, and then the solid plastic is cooled to form the plastic layer, and each of the plastic layers is provided with two layers respectively arranged at the end portions of the both sides of the rattan mat.

7. The processing method of plastic rattan mat glue injection and penetration structure according to claim 4, wherein in step 4, the end portions of the rattan mat are preheated to soften the end portions of the rattan mat, and glue injection is performed after the end portions are softened.

8. A plastic rattan mat glue injection and penetration structure,-manufactured by the processing method of plastic rattan mat glue injection and penetration structure according to claim 1.

9. The plastic rattan mat glue injection and penetration structure according to claim 8, wherein an opening groove for the rattan mat passing therethrough and an inner cavity for being engaged with the end portion of the rattan mat are arranged in the outer frame, each end portion of the rattan mat passes through the opening groove and is fixedly connected to the outer frame, and each of the plastic layers is installed in the inner cavity of the outer frame.

10. The plastic rattan mat glue injection and penetration structure according to claim 8, wherein a thickness of each plastic layers ranges 1 mm-3 mm, and a total thickness of the rattan mat and the two plastic layers ranges 5 mm-6 mm.

11. The plastic rattan mat glue injection and penetration structure according to claim 8, wherein a ratio of the thickness of each plastic layers to a thickness of the rattan mat ranges 0.4~1.

* * * * *